(12) United States Patent
Uehara et al.

(10) Patent No.: US 8,999,466 B2
(45) Date of Patent: Apr. 7, 2015

(54) MULTILAYER STRETCHED POLYAMIDE FILM

(75) Inventors: Norio Uehara, Moriyama (JP); Naoyuki Maruichi, Moriyama (JP); Hiroyuki Yoshizaki, Moriyama (JP); Atsushi Nakagawa, Yokkaichi (JP)

(73) Assignees: Gunze Limited, Ayabe-shi (JP); Mitsubishi Chemical Corporation, Tokyo (JP)

( * ) Notice: Subject to any disclaimer, the term of this patent is extended or adjusted under 35 U.S.C. 154(b) by 535 days.

(21) Appl. No.: 13/123,923

(22) PCT Filed: Oct. 21, 2009

(86) PCT No.: PCT/JP2009/068143
§ 371 (c)(1),
(2), (4) Date: Apr. 13, 2011

(87) PCT Pub. No.: WO2010/047354
PCT Pub. Date: Apr. 29, 2010

(65) Prior Publication Data
US 2011/0200770 A1  Aug. 18, 2011

(30) Foreign Application Priority Data

Oct. 24, 2008  (JP) .................................. 2008-274775
Oct. 24, 2008  (JP) .................................. 2008-274784

(51) Int. Cl.
*B32B 1/02*  (2006.01)
*B32B 27/34*  (2006.01)
*B32B 25/08*  (2006.01)
*B32B 25/14*  (2006.01)
*B32B 27/08*  (2006.01)
*B32B 27/32*  (2006.01)
*B32B 27/36*  (2006.01)
*B32B 1/08*  (2006.01)

(52) U.S. Cl.
CPC ................. *B32B 27/34* (2013.01); *B32B 25/08* (2013.01); *B32B 25/14* (2013.01); *B32B 27/08* (2013.01); *B32B 27/32* (2013.01); *B32B 27/36* (2013.01)

(58) Field of Classification Search
USPC ............ 428/34.1, 34.2, 35.7, 35.9, 36.9, 35.2
See application file for complete search history.

(56) References Cited

U.S. PATENT DOCUMENTS

| 5,716,715 A | 2/1998 | Degrassi et al. |
| 6,586,091 B2 | 7/2003 | Iijima et al. |
| 6,670,429 B2 * | 12/2003 | Appelman et al. .......... 525/444.5 |
| 2003/0059606 A1 | 3/2003 | Iijima et al. |
| 2007/0065673 A1 * | 3/2007 | Nanba et al. ............... 428/474.4 |

FOREIGN PATENT DOCUMENTS

| JP | 8-118569 A | | 5/1996 |
| JP | 2002-144486 A | | 5/2002 |
| JP | 2004-001252 | * | 1/2004 |
| JP | 2004-001252 A | * | 1/2004 |
| JP | 2005-329627 | * | 12/2005 |
| JP | 2007-083476 A | | 4/2007 |
| JP | 2008-074008 A | | 4/2008 |
| JP | 2008-100496 A | | 5/2008 |
| JP | 2008-254286 A | | 10/2008 |
| WO | 95/34425 A1 | | 12/1995 |

OTHER PUBLICATIONS

International Search Report of PCT/2009/068143, date of mailing Feb. 9, 2010.

* cited by examiner

*Primary Examiner* — Marc Patterson
(74) *Attorney, Agent, or Firm* — Westerman, Hattori, Daniels & Adrian, LLP

(57) ABSTRACT

An object of the present invention is to provide a multilayer stretched polyamide-based film having excellent bending resistance, thermal dimensional stability and aroma retention, whose lamination strength is measureable when a sealing layer is laminated thereon.

Specifically, the invention provides a multilayer stretched polyamide-based film obtained by biaxially stretching a multilayer laminate including three layers consisting of a polyester layer (Layer A), an adhesive layer (Layer B), and a polyamide layer (Layer C), wherein
Layer A contains a crystalline polyester,
Layer B contains a modified polyester-based elastomer,
Layer C contains an aliphatic polyamide, and
Layer C has a thickness of 5 μm or more, and
wherein a sealing layer is to be laminated on Layer C by a lamination method, after biaxially stretching the multilayer laminate.

12 Claims, No Drawings

MULTILAYER STRETCHED POLYAMIDE FILM

TECHNICAL FIELD

The present invention relates to a multilayer stretched polyamide-based film that, while maintaining a high level of toughness, exhibits excellent dimensional stability and aroma retention; and that can be easily handled. The present invention also relates to a multilayer stretched polyamide-based film that, while maintaining a high level of toughness, exhibits excellent dimensional stability, aroma retention and curl resistance.

BACKGROUND ART

Heretofore, polyamide films containing a nylon resin have been widely used in various fields as films having desirable gas barrier properties, toughness, pinhole resistance, and the like.

In order to impart dimensional stability and aroma retention to such polyamide films, multilayer films with polyester/polyamide/polyester laminated thereon have been disclosed (for example, Patent Literatures 1 and 2).

The multilayer films disclosed in Patent Literatures 1 and 2 exhibit the aforementioned excellent properties. However, a problem occurs, for example, if the multilayer films disclosed in Patent Literatures 1 and 2 are formed into a packaging film by laminating a sealing layer formed of an olefin-based resin or the like thereon by dry lamination etc. The problem is that when the lamination strength between the multilayer film and the sealing layer is measured, delamination occurs between the polyester/polyamide layers on the side on which the sealing layer is laminated. Therefore, its lamination strength is sometimes immeasurable. If the lamination strength is immeasurable, the quality of the packaging film cannot be checked. Therefore, a film with polyamide and polyester laminated therein having excellent lamination characteristics has been desired.

A multilayer stretched polyamide-based film composed of a multilayer stretched film comprising a polyamide resin layer (X)/polyamide resin layer (Y), wherein the polyamide resin layer (Y) contains amorphous polyamide, has been disclosed (for example, Patent Literature 3).

Patent Literature 3 discloses that the multilayer film of Patent Literature 3 is excellent in heat resistance, transparency, gas barrier properties and pinhole resistance. However, when the multilayer film is used as a packaging film for wrapping foods and the like, leakage of the aroma of the content and the like are observed. This results in deterioration of the quality or commercial value of the content, and is thus undesirable. Therefore, packaging films are required to have high aroma retention. Furthermore, when the multilayer film is used as a packaging film that is subjected to more severe boiling treatment or retort treatment, higher thermal dimensional stability is required.

Multilayer stretched polyamide-based films are distributed as packaging films for wrapping foods and the like, and pinholes may occur due to abrasion while they are being conveyed, transported, etc. Such pinholes impair the excellent gas barrier properties of the multilayer film. Accordingly, multilayer films having excellent bending resistance have been desired in the market.

CITATION LIST

Patent Literatures

PTL 1: Japanese Unexamined Patent Publication No. 2008-74008

PTL 2: Japanese Unexamined Patent Publication No. 2008-100496

PTL 3: Japanese Unexamined Patent Publication No. 1996-118569

SUMMARY OF INVENTION

Technical Problem

An object of the present invention is to provide a multilayer stretched polyamide-based film having excellent bending resistance, thermal dimensional stability, aroma retention and the like, whose lamination strength is measureable when a sealing layer is laminated thereon. Another object of the present invention is to provide a multilayer stretched polyamide-based film having excellent bending resistance, thermal dimensional stability, aroma retention, curl resistance and the like.

Solution to Problem

The present inventors conducted extensive research and found that the above objects can be achieved by the following multilayer stretched films.

1) A multilayer stretched film obtained by biaxially stretching a multilayer laminate comprising three layers, namely a polyester layer (Layer A), an adhesive layer (Layer B), and a polyamide layer (Layer C).

2) A multilayer stretched polyamide-based film obtained by biaxially stretching a multilayer laminate comprising at least four layers, namely a polyester layer (Layer A), an adhesive layer (Layer B), a polyamide layer (Layer C), and a polyamide layer (Layer D). The present invention has been accomplished based on these findings and further study.

Specifically, the present invention provides the following multilayer stretched polyamide-based films.

Item 1. A multilayer stretched polyamide-based film obtained by biaxially stretching a multilayer laminate comprising three layers consisting of a polyester layer (Layer A), an adhesive layer (Layer B), and a polyamide layer (Layer C), Layer A containing a crystalline polyester,
Layer B containing a modified polyester-based elastomer,
Layer C containing an aliphatic polyamide, and
Layer C having a thickness of 5 μm or more, and
wherein a sealing layer is to be laminated on Layer C by a lamination method, after biaxially stretching the multilayer laminate.

Item 2. A multilayer stretched polyamide-based film obtained by biaxially stretching a multilayer laminate comprising at least four layers consisting of a polyester layer (Layer A), an adhesive layer (Layer B), a polyamide layer (Layer C), and a polyamide layer (layer D), Layer A containing a crystalline polyester,
Layer B containing a modified polyester-based elastomer,
Layer C containing an aliphatic polyamide,
Layer D containing an aromatic polyamide, and
Layer C and Layer D having a total thickness of 5 μm or more, and
wherein a sealing layer is to be laminated on Layer D by a lamination method, after biaxially stretching the multilayer laminate.

Item 3. The multilayer stretched polyamide-based film according to Item 1 or 2, wherein the crystalline polyester contained in Layer A is polyethylene terephthalate or isophthalic acid copolymerized polyethylene terephthalate.

Item 4. The multilayer stretched polyamide-based film according to Item 1 or 2, wherein the aliphatic polyamide contained in Layer C is at least one member selected from the group consisting of nylon-6, copolymers of nylon-6 and nylon-6,6, and mixtures thereof.

Item 5. The multilayer stretched polyamide-based film according to Item 1 or 2, wherein Layer C further contains aromatic polyamide in a proportion of 1 wt. % or more, and less than 50 wt. %.

Item 6. The multilayer stretched polyamide-based film according to Item 1, wherein Layer C further contains aromatic polyamide in a proportion of 50 to 90 wt. %.

Item 7. The multilayer stretched polyamide-based film according to Item 5, wherein the aromatic polyamide is polymethaxyleneadipamide or amorphous nylon.

Item 8. The multilayer stretched polyamide-based film according to Item 6, wherein the aromatic polyamide is polymethaxyleneadipamide or amorphous nylon.

Item 9. The multilayer stretched polyamide-based film according to Item 2, wherein the aromatic polyamide is polymethaxyleneadipamide.

Item 10. The multilayer stretched polyamide-based film according to Item 1 or 2, wherein corona discharge treatment is applied to the surface opposite to the Layer A side.

Item 11. The multilayer stretched polyamide-based film according to Item 1, which has a total thickness within the range of 20 to 50 μm.

Item 12. The multilayer stretched polyamide-based film according to Item 2, which has a total thickness within the range of 10 to 50 μm.

Item 13. A packaging film comprising a sealing layer laminated on Layer C of the multilayer stretched polyamide-based film of Item 1.

Item 14. A packaging film comprising a sealing layer laminated on Layer D of the multilayer stretched polyamide-based film of Item 2.

Item 15. The packaging film according to Item 13 or 14, wherein the sealing layer comprises at least one resin selected from the group consisting of linear low-density polyethylene, low-density polyethylene, unstretched polypropylene, and ethylene-vinyl acetate copolymer.

Item 16. A packaging bag obtained by forming the packaging film of Item 13 or 14 into a bag-like shape, and then heat-sealing facing surfaces of the sealing layer.

Item 17. A package comprising the packaging bag of Item 16 with content placed inside.

Advantageous Effects of Invention

The multilayer stretched polyamide-based film of the present invention is excellent in bending resistance, thermal dimensional stability, aroma retention, and the like. The multilayer stretched polyamide-based film of the present invention has excellent curl resistance when it has a total thickness of 20 μm or more, or when Layer C contains 50 to 90 wt. % of aromatic polyamide and 10 to 50 wt. % of aliphatic polyamide. Furthermore, when a sealing layer is laminated on Layer C of the multilayer stretched polyamide-based film of the present invention, the lamination strength between the multilayer stretched polyamide-based film and the sealing layer can be measured.

The multilayer stretched polyamide-based film according to another embodiment of the present invention has excellent bending resistance, lamination strength, thermal dimensional stability, aroma retention, and curl resistance.

The multilayer stretched film of the present invention having such excellent characteristics is suitably used as a packaging film.

DESCRIPTION OF EMBODIMENTS

1. Multilayer Stretched Polyamide-Based Film

The multilayer stretched polyamide-based film of the present invention is obtained by biaxially stretching a multilayer laminate comprising three layers consisting of a polyester layer (Layer A), an adhesive layer (Layer B), and a polyamide layer (Layer C), wherein Layer A contains crystalline polyester,
Layer B contains a modified polyester-based elastomer,
Layer C contains an aliphatic polyamide, and
Layer C has a thickness of 5 μm or more,
wherein a sealing layer is to be laminated on Layer C by a lamination method, after biaxially stretching the multilayer (hereunder, this film is referred to as Multilayer Stretched Polyamide-Based Film 1).

Alternatively, the multilayer stretched polyamide-based film of the present invention is obtained by biaxially stretching a multilayer laminate comprising at least four layers consisting of a polyester layer (Layer A), an adhesive layer (Layer B), a polyamide layer (Layer C), and a polyamide layer (Layer D), wherein Layer A contains a crystalline polyester,
Layer B contains a modified polyester-based elastomer,
Layer C contains an aliphatic polyamide,
Layer D contains an aromatic polyamide, and
Layer C and Layer D has a total thickness of 5 μm or more,
wherein a sealing layer is to be laminated on Layer D by a lamination method, after biaxially stretching the multilayer laminate (hereunder, this film is referred to as Multilayer Stretched Polyamide-Based Film 2).

The structures of Multilayer Stretched Polyamide-based Films 1 and 2 are described below. Multilayer Stretched Polyamide-Based Films 1 and 2 may be simply referred to as Multilayer Stretched Films 1 and 2.

1.1 Multilayer Stretched Polyamide-Based Film 1

(1) Layer A

In the present invention, Layer A imparts dimensional stability, aroma retention, heat resistance and like properties to the multilayer stretched film.

Layer A comprises crystalline polyester as a main component. The crystalline polyester is not particularly limited as long as it can impart dimensional stability, aroma retention, heat resistance and like properties to the multilayer stretched polyamide-based film of the present invention. Examples of crystalline polyesters include those obtained by polycondensation of dicarboxylic acid and diol.

Examples of dicarboxylic acids include o-phthalic acid, terephthalic acid, isophthalic acid, succinic acid, adipic acid, sebacic acid, azelaic acid, octylsuccinic acid, cyclohexanedicarboxylic acid, naphthalene dicarboxylic acid, fumaric acid, maleic acid, itaconic acid, decamethylenecarboxylic acid, and anhydrides and lower-alkyl esters thereof; and 5-sulfoisophthalic acid, 2-sulfoisophthalic acid, 4-sulfoisophthalic acid, 3-sulfophthalic acid, dialkyl 5-sulfoisophtharate, dialkyl 2-sulfoisophtharate, dialkyl 4-sulfoisophtharate, dialkyl 3-sulfoisophtharate, sodium salts and potassium salts thereof and like sulfonyl-containing dicarboxylic acids.

Examples of diols include ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, 2-ethyl-1,3-hexanediol and like aliphatic diols; 2,2-bis(4-hydroxycyclohexyl)propane, 2,2-bis(4-hydroxycyclohexyl)propane and like alkylene oxide adducts; 1,4-cyclohexanediol, 1,4-cyclohexanedimethanol and like alicyclic diols; and 1,3-dihydroxy butanesulfonic acid, 1,4-dihydroxy butanesulfonic acid and like sulfonyl-containing diols.

Among these, preferable diols are polyethylene terephthalates (PETs) comprising terephthalic acid as the component derived from dicarboxylic acid, and ethylene glycol as the component derived from diol; isophthalic acid copolymerized polyethylene terephthalates comprising terephthalic acid (99 to 80 mol %) and isophthalic acid (1 to 20 mol %) as the components derived from dicarboxylic acid, and ethylene glycol as the component derived from diol; and sulfoisophthalic acid copolymerized polyethylene terephthalates comprising terephthalic acid (99.5 to 90 mol %) and 5-sodium sulfoisophthalic acid (0.5 to 10 mol %) as the components derived from dicarboxylic acid, and ethylene glycol as the component derived from diol from the viewpoint of dimensional stability, aroma retention, heat resistance and the like. Polyethylene terephthalates (PETs) comprising terephthalic acid and ethylene glycol are more preferable.

These crystalline polyesters are commercially available. For example, BELLPET-EFG6C, BELLPET-PIFG5 (both are produced by Bell Polyester Products, Inc.) and the like may be used as the crystalline polyester for forming Layer A.

The crystalline polyesters for forming Layer A may be used singly or in a combination of two or more, if necessary. It is also possible to provide two or more Layers A.

Layer A may contain one or more resins that are compatible with crystalline polyester, if necessary. In that case, the crystalline polyester content is generally 50 wt. % or more, and preferably 70 wt. % or more per total weight of the components of Layer A.

Examples of resins compatible with crystalline polyester include amorphous polyesters and the like. Amorphous polyesters are those in which the amount of fusion heat is not observed in the differential scanning calorimetry performed according to JIS K 7121. Specific examples of preferable amorphous polyesters include polyesters comprising terephthalic acid as the component derived from dicarboxylic acid, and ethylene glycol (20 to 80 mol %) and cyclohexane dimethanol (80 to 20 mol %) as the components derived from diol; and polyesters comprising terephthalic acid (20 to 80 mol %) and isophthalic acid (80 to 20 mol %) as the components derived from dicarboxylic acid, and ethylene glycol as the component derived from diol. Such amorphous polyesters are commercially available, and examples thereof include Eastar Copolyester 6763 (produced by Eastman Chemical Company) and the like.

Known inorganic or organic additives and the like may be added to Layer A in an amount that does not impair the effect of the present invention. Examples of inorganic or organic additives include anti-blocking agents, nucleating agents, repellents, antioxidants, thermostabilizers, lubricants, antistatic agents, colorants, pigments, dyes and the like. These additives may be used in a suitable amount.

(2) Layer B

In the present invention, Layer B is used to make Layer A adhere to Layer C, which is described later. The presence of Layer B remarkably increases the interlaminar strength between Layer A and Layer C after adhesion. A modified polyester-based elastomer may be used in Layer B of the multilayer stretched film of the present invention.

Examples of modified polyester-based elastomers forming Layer B are those obtained by modifying polyester-based elastomers using a modifier.

The polyester-based elastomers are preferably saturated polyester-based elastomers. In particular, saturated polyester-based elastomers containing a polyalkylene ether glycol segment are preferable. Preferable examples of saturated polyester-based elastomers containing a polyalkylene ether glycol segment include block copolymers comprising an aromatic polyester, which is a hard segment; and a polyalkylene ether glycol or aliphatic polyester, which is a soft segment. Polyester-polyether block copolymers comprising polyalkylene ether glycol as the soft segment are more preferable.

The polyester-polyether block copolymers are preferably obtained by using (i) a $C_{2-12}$ aliphatic and/or alicyclic diol, (ii) an aromatic dicarboxylic acid and/or aliphatic dicarboxylic acid or an alkyl ester thereof, and (iii) a polyalkylene ether glycol as starting materials; subjecting these starting materials to an esterification reaction or ester exchange reaction to obtain oligomers; and polycondensing the oligomers thus obtained.

Examples of the $C_{2-12}$ aliphatic and/or alicyclic diols described above include those generally used as the materials for polyesters, in particular, for polyester-based elastomers. Specific examples thereof include ethylene glycol, propylene glycol, trimethylene glycol, 1,4-butanediol, 1,4-cyclohexanediol, 1,4-cyclohexane dimethanol and the like. Among these, 1,4-butanediol and ethylene glycol are preferable, and 1,4-butanediol is particularly preferable. These diols may be used singly, or in a combination of two or more.

Examples of aromatic dicarboxylic acids include those generally used as materials for polyesters, in particular, for polyester-based elastomers. Specific examples thereof include terephthalic acid, isophthalic acid, phthalic acid, 2,6-naphthalene dicarboxylic acid and the like. Among these, terephthalic acid and 2,6-naphthalene dicarboxylic acid are preferable, and terephthalic acid is particularly preferable. These aromatic dicarboxylic acids may be used singly, or in a combination of two or more.

Examples of alkyl esters of the aromatic dicarboxylic acids include dimethyl esters and diethyl esters of the aforementioned aromatic dicarboxylic acids. Among these, dimethyl terephthalate and 2,6-dimethylnaphtalene dicarboxylate are preferable.

Preferable examples of aliphatic dicarboxylic acids include cyclohexanedicarboxylic acids and the like, and preferable examples of alkyl esters thereof include dimethyl esters, diethyl esters and the like. Other than the components mentioned above, a small amount of trifunctional alcohol and tricarboxylic acid or an ester thereof may be copolymerized therein. In addition, adipic acids and like aliphatic dicarboxylic acids or dialkyl esters thereof may be used as copolymerization components.

Examples of polyalkylene ether glycols include polyethylene glycols, poly(1,2- and/or 1,3-propylene ether)glycols, poly(tetramethylene ether)glycols, poly(hexamethylene ether)glycols and the like.

The lower limit of the number average molecular weight of the polyalkylene ether glycol is preferably 400, and the upper limit is preferably 6,000. When the number average molecular weight is 400 or more, the block properties of the copolymer can be enhanced. When the number average molecular weight is 6,000 or less, phase separation in the system barely occurs and polymer properties can easily be expressed. A more preferable lower limit is 500, and a more preferable upper limit is 4,000. A still more preferable lower limit is 600, and a still more preferable upper limit is 3,000.

In the present specification, the number average molecular weight means the value measured using gel permeation chromatography (GPC). The calibration of the aforementioned GPC can be conducted using a POLYTETRAHYDROFURAN calibration kit (produced by Polymer Laboratories Ltd. of the UK).

The polyester-based elastomers may also comprise natural rubber, synthetic rubber (for example, polyisoprene rubber) and like rubber compositions; and process oil and like softeners. By allowing softeners to coexist with the polyester-based elastomers, the plasticization of the rubber compositions and the flowability of the thermoplastic resin composition can be increased.

The softening agents may be paraffin-based, naphthene-based, or aromatic. Insofar as it does not impair the effect of the present invention, resins, rubbers, fillers, additives and the like other than those mentioned above may be added to the resin component and rubber component.

Examples of fillers include calcium carbonate, talc, silica, kaolin, clay, diatom earth, calcium silicate, mica, asbestos, alumina, barium sulfate, aluminium sulfate, calcium sulfate, magnesium carbonate, carbon fiber, glass fiber, glass bulb, molybdenum sulfide, graphite, Silas-balloon and the like. Examples of additives include heat-resistant stabilizers, weather-resistant stabilizers, colorants, antistatic agents, flame retardants, nucleating agents, lubricants, slipping agents, antiblocking agents and the like.

As for the heat-resistant stabilizers mentioned above, phenol-based, phosphorus-based, sulfur-based and like known heat-resistant stabilizers can be used. As for the weather-resistant stabilizers mentioned above, hindered amine-based, triazole-based and like known weather-resistant stabilizers can be used. As for the colorants mentioned above, carbon black, titanium white, zinc white, red iron oxide, azo compound, nitroso compound, phthalocyanine compound and the like can be used. As for the antistatic agents, flame retardants, nucleating agents, lubricants, slipping agents, antiblocking agents and like known agents are also usable.

Examples of commercially available polyester-based elastomers include "PRIMALLOY" (produced by Mitsubishi Chemical Corporation), "PELPRENE" (produced by Toyobo Co., Ltd.), "Hytrel" (produced by Du Pont-Toray Co., Ltd.) and the like.

When a polyester-polyether block copolymer formed of polyester and polyalkylene ether glycol is used as the polyester-based elastomer, the lower limit of the content of the polyalkylene ether glycol is preferably 5 wt. %, and the upper limit is preferably 90 wt. %. When the content of the polyalkylene ether glycol is more than 5 wt. %, the resulting film will have excellent flexibility and impact resistance. When the content of the polyalkylene ether glycol is 90 wt. % or less, the resulting film will have excellent hardness and mechanical strength. A more preferable lower limit is 30 wt. %, and a more preferable upper limit is 80 wt. %. A still more preferable lower limit is 55 wt. %. The content of polyalkylene ether glycol components can be calculated using nuclear magnetic resonance spectroscopy (NMR), based on the chemical shift of hydrogen atoms and the content thereof.

The modification reaction to obtain a modified polyester-based elastomer can be conducted, for example, by reacting $\alpha,\beta$-ethylenically unsaturated carboxylic acid that functions as a modifier to polyester-based elastomer. It is preferable to use a radical generator in the modification reaction. During the modification reaction, a graft reaction, in which $\alpha,\beta$-ethylenically unsaturated carboxylic acid or a derivative thereof is added to the polyester-based elastomer, mainly occurs; however, a decomposition reaction also occurs. As a result, the melt viscosity of the modified polyester-based elastomer may be lowered due to the reduction of its molecular weight. Furthermore, in the modification reaction, it is generally believed that an ester exchange reaction and other reactions also occur. Therefore, the resulting reaction product generally contains unreacted starting materials and the like. In this case, the content of the modified polyester-based elastomer in the resulting reactant is 10 wt. % or more, preferably 30 wt. % or more, and more preferably 100 wt. %.

Examples of $\alpha,\beta$-ethylenically unsaturated carboxylic acids include acrylic acid, maleic acid, fumaric acid, tetrahydrofumaric acid, itaconic acid, citraconic acid, crotonic acid, isocrotonic acid and like unsaturated carboxylic acids; 2-octene-1-yl-succinic anhydride, 2-dodecen-1-yl-succinic anhydride, 2-octadecen-1-yl-succinic anhydride, maleic anhydride, 2,3-dimethyl maleic anhydride, bromomaleic anhydride, dichloromaleic anhydride, citraconic anhydride, itaconic anhydride, 1-butene-3,4-dicarboxylic anhydride, 1-cyclopentene-1,2-dicarboxylic anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2,3-dicarboxylic anhydride, endo-bicyclo[2.2.2]oct-5-ene-2,3-dicarboxylic anhydride, bicyclo[2.2.2]oct-7-ene-2,3,5,6-tetracarboxylic anhydride and like unsaturated carboxylic anhydrides. Among these, acid anhydrides are preferable due to their high reactivity. The $\alpha,\beta$-ethylenically unsaturated carboxylic acids mentioned above may be suitably selected depending on the copolymer that contains the polyalkylene ether glycol segment to be modified, or the modification conditions. They may be used singly, or in a combination of two or more. The $\alpha,\beta$-ethylenically unsaturated carboxylic acids may also be used after being dissolved in an organic solvent or the like.

Examples of radical generators include t-butyl hydroperoxide, cumene hydroperoxide, 2,5-dimethylhexane-2,5-dihydroperoxide, 2,5-dimethyl-2,5-bis(tertiary butyloxy)hexane, 3,5,5-trimethylhexanoylperoxide, t-butyl peroxybenzoate, benzoyl peroxide, dicumylperoxide, 1,3-bis(t-butylperoxy isopropyl)benzene, dibutylperoxide, methyl ethyl ketone peroxide, potassium peroxide, hydrogen peroxide and like organic or inorganic peroxides; 2,2'-azobis isobutyronitrile, 2,2'-azobis(isobutyramide) dihalide, 2,2'-azobis[2-methyl-N-(2-hydroxyethyl)propionamide], azodi-t-butane and like azo compounds; dicumyl and like carbon radical generators; etc.

The radical generator may be suitably selected depending on the types of polyester-based elastomers and $\alpha,\beta$-ethylenically unsaturated carboxylic acids used in the modification reaction, and the modification conditions. The radical generators may be used in a combination of two or more. The radical generators may also be used after being dissolved in an organic solvent or the like.

The lower limit of the proportion of the $\alpha,\beta$-ethylenically unsaturated carboxylic acid is preferably 0.01 part by weight per 100 parts by weight of polyester-based elastomer, and the upper limit is preferably 30.0 parts by weight. When the $\alpha,\beta$-ethylenically unsaturated carboxylic acid is used in a proportion of 0.01 part by weight or more, the modification reaction can proceed sufficiently. If the necessary amount thereof is 30.0 parts by weight or less, the production method becomes economically advantageous. A more preferable lower limit is 0.05 part by weight, and a more preferable upper limit is 5.0 parts by weight. A still more preferable lower limit is 0.10 part by weight, and a still more preferable upper limit is 1.0 part by weight.

The lower limit of the proportion of the radical generator is preferably 0.001 part by weight per 100 parts by weight of polyester-based elastomer, and the upper limit is preferably 3.00 parts by weight. When the proportion of the radical generator is 0.001 part by weight or more, the modification reaction easily occurs. When the proportion thereof is 3.00 parts by weight or less, the reduction of material strength due to lowering of the molecular weight (lowering viscosity) during the modification barely occurs. A more preferable lower limit is 0.005 part by weight, and a more preferable upper limit is 0.50 part by weight. A still more preferable lower limit is 0.010 part by weight, a still more preferable upper limit is 0.20 part by weight, and a particularly preferable upper limit is 0.10 part by weight.

The modification reaction to obtain the modified polyester-based elastomer described above may be conducted by a known method such as a melt-kneading reaction method, solution reaction method, suspension dispersion reaction and the like. Among these, the melt-kneading reaction method is generally preferable because it is inexpensive.

In the melt-kneading reaction method, the aforementioned components are uniformly mixed at a specific compounding ratio, and then subjected to melt-kneading. A Henschel mixer, ribbon blender, V-shaped blender and the like can be used to mix the components. A Banbury mixer, kneader or roll, or a uniaxial, biaxial or other multi-axial kneading extruder, etc. can be used for melt kneading.

The lower limit of the temperature at which the melt-kneading is conducted is preferably 100° C., and the upper limit is preferably 300° C. By setting the kneading temperature within the above range, thermal degradation of resin can be prevented. A more preferable lower limit is 120° C., and a more preferable upper limit is 280° C. A still more preferable lower limit is 150° C., and a still more preferable upper limit is 250° C.

The lower limit of the modification percentage (graft rate) of the modified polyester-based elastomer is preferably 0.01 wt. %, and the upper limit is preferable 10.0 wt. %. When the modification percentage is 0.01 wt. % or more, excellent compatibility with polyester can be attained. When the modification percentage is 10.0 wt. % or less, the reduction in strength due to molecular degradation occurring during the modification reaction decreases. A more preferable lower limit is 0.03 wt. %, and a more preferable upper limit is 7.0 wt. %. A still more preferable lower limit is 0.05 wt. %, and a still more preferable upper limit is 5.0 wt. %.

The modification percentage (graft rate) of the aforementioned modified polyester-based elastomer can be calculated using Formula (I) shown below from the spectra obtained by $H^1$-NMR measurement. In the $H^1$-NMR measurement, for example, "GSX-400" (produced by JEOL Ltd.) can be used.

[Math. 1]

$$\text{Graft rate (wt \%)} = 100 \times \frac{\frac{C \times 98}{3}}{\frac{A \times 148}{4} + \frac{B \times 72}{4} + \frac{C \times 98}{3}} \quad (1)$$

In Formula (I), A represents an integral value at 7.8 to 8.4 ppm, B represents an integral value at 1.2 to 2.2 ppm, and C represents an integral value at 2.4 to 2.9 ppm.

A specific example of the preferable modified polyester-based elastomer is PRIMALLOY AP IF203 (density: 1.09, melting point: 180° C., produced by Mitsubishi Chemical Corporation).

(3) Layer C

Layer C, which forms the inner layer, is located at the innermost layer position of the multilayer stretched film of the present invention. Layer C imparts bending resistance, impact resistance and like properties to the multilayer stretched film. Layer C contains aliphatic polyamide.

(3-1) Aliphatic Polyamide

Examples of aliphatic polyamides include aliphatic nylons and copolymers thereof. Specific examples thereof include polycapramide (nylon-6), poly-ω-aminoheptanoic acid (nylon-7), poly-ω-aminononanoic acid (nylon-9), polyundecanoamide (nylon-11), poly(lauryl lactam) (nylon-12), polyethylenediamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6), polydecamethylene adipamide (nylon-10,8), caprolactam/lauryl lactam copolymer (nylon-6/12), caprolactam/ω-aminononanoic acid copolymer (nylon-6/9), caprolactam/hexamethylene diammonium adipate copolymer (nylon-6/6,6), lauryl lactam/hexamethylene diammonium adipate copolymer (nylon-12/6,6), ethylenediamine adipamide/hexamethylene diammonium adipate copolymer (nylon-2,6/6,6), caprolactam/hexamethylene diammonium adipate/hexamethylene diammonium sebacate copolymer (nylon-6,6/6,10), ethylene ammonium adipate/hexamethylene diammonium adipate/hexamethylene diammonium sebacate copolymer (nylon-6/6,6/6,10), and the like. Two or more of these aliphatic polyamides may be used in combination.

Examples of preferable aliphatic polyamides include nylon-6, nylon-6,6, nylon-6/6,6 (a copolymer of nylon-6 and nylon-6,6), and the like. Among these, nylon-6 and nylon-6/6,6 are more preferable, and nylon-6 is particularly preferable. As for a combination of two or more aliphatic polyamides, a combination of nylon-6 and nylon-6/6,6 (weight ratio of about 50:50 to 95:5) is preferable.

(3-2) Aromatic Polyamide

Layer C contains the aliphatic polyamide as an essential component, and aromatic polyamide may be added thereto, if necessary. Adding aromatic polyamide, depending on its amount, may impart excellent curl resistance to the multilayer stretched film of the present invention.

Examples of aromatic polyamides include crystalline aromatic polyamides obtained by a polycondensation reaction of metaxylenediamine, paraxylenediamine or like aromatic diamine with adipic acid, suberic acid, sebacic acid, cyclohexanedicarboxylic acid, terephthalic acid, isophthalic acid or like dicarboxylic acid or a derivative thereof. A preferable example thereof is a crystalline aromatic polyamide such as polymethaxyleneadipamide (MXD-nylon). Specific examples include S-6007 and S-6011 (both are produced by Mitsubishi Gas Chemical Company, Inc.).

It is also possible to use amorphous aromatic polyamides (amorphous nylons) obtained by a polycondensation reaction of hexamethylene diamine or like aliphatic diamine with terephthalic acid, isophthalic acid or like dicarboxylic acid or a derivative thereof. Preferable examples thereof include copolymers of hexamethylene diamine, terephthalic acid, hexamethylene diamine, and isophthalic acid. A specific example is Selar PA (produced by Du Pont-Mitsui Polychemicals Co., Ltd.).

Examples of preferable combinations of aliphatic polyamide and aromatic polyamide for Layer C of the present invention include a combination of nylon-6 and MXD-nylon, and a combination of nylon-6 and amorphous aromatic polyamide (amorphous nylon).

(3-3) Content of Aromatic Polyamide

When an aromatic polyamide is added to Layer C of the present invention, the content of the aromatic polyamide can be suitably selected within the aforementioned range depending on the physical properties to be imparted. For example, when the content of the aromatic polyamide is adjusted to from 1 wt. % or more to less than 50 wt. %, preferably from 1 to 25 wt. %, and more preferably from 1 wt. % or more to less than 25 wt. %, properties of Layer C such as the bending resistance and impact resistance will not be adversely affected. In order to provide curl resistance in addition to the bending resistance, impact resistance and the like, the content of the aromatic polyamide should be adjusted to from 50 to 90 wt. %, and preferably from 60 to 80 wt. %. By adjusting the content of the aliphatic polyamide in Layer C of the present invention to 10 wt. % or more, and preferably 20 wt. % or more, a sufficient lamination strength can be attained when the sealing layer is laminated thereon.

Layer C may consist of the aforementioned polyamide-based resins; however, known bending resistance-improving agents, inorganic or organic additives and the like may be added if necessary, insofar as they do not impair the effect of the present invention.

Examples of bending resistance-improving agents include polyolefins, polyester elastomers, polyamide elastomers and the like. The content of the bending resistance-improving agent may be suitably selected within the range of 0.5 to 10 wt. %.

Examples of inorganic or organic additives include anti-blocking agents, nucleating agents, repellents, antioxidants, thermostabilizers, lubricants, antistatic agents and the like. When an anti-blocking agent is necessary, silica, talc, kaolin and the like may be added within the range of about 100 to 5000 ppm.

(4) Layer Structure

The multilayer stretched polyamide-based film 1 of the present invention has a three-layer structure in which Layers A, B, and C are laminated in this order by biaxial stretching, and Layer A is placed as the outer layer. The multilayer stretched polyamide-based film 1 preferably consists of only these three layers. The multilayer stretched polyamide-based film 1 of the present invention is has a structure, in which a sealing layer is to be laminated on Layer C by a lamination method, after biaxially stretching the multilayer laminate.

The total film thickness of the multilayer stretched polyamide-based film of the present invention having the aforementioned layer structure is not particularly limited, and may be suitably determined according to the application. The total film thickness thereof is generally about 6.5 to 50 µm, and preferably about 10 to 30 µm.

In general, the film thickness of each layer is as follows.

Layer A has a film thickness of about 1 µm or more, preferably about 1 to 15 µm, and more preferably about 2 to 12 µm. When Layer A has a thickness of 1 µm or more, excellent dimensional stability, aroma retention, heat resistance, etc. can be imparted to the multilayer film of the present invention.

Layer B has a film thickness of about 0.5 to 5 µm, and preferably about 0.5 to 2.5 µm. When Layer B has a thickness of 0.5 µm or more, the film thickness can be easily controlled; whereas when Layer B has a thickness of 5 µm or less, sufficient adhesion strength can be imparted, and production cost can be reduced.

Layer C has a thickness of 5 µm or more, preferably about 5 to 35 µm, and more preferably about 7 to 20 µm. When Layer C has a thickness of 5 µm or more, excellent bending resistance, impact resistance, etc. can be imparted to the multilayer stretched film of the present invention.

In the multilayer stretched polyamide-based film of the present invention, the ratio of the thickness of each layer is as follows. The ratio of Layer B is 0.05 to 2.0, and preferably 0.2 to 1.0; and the ratio of Layer C is 0.8 to 12.0, preferably 1.0 to 10.0, and more preferably 1.5 to 8.0 when the ratio of Layer A is 1.

Since the multilayer stretched film of the present invention has a total film thickness of 20 µm or more, preferably 20 to 50 µm, more preferably 25 to 50 µm, and even more preferably 35 to 50 µm, excellent curl resistance can be imparted even when Layer C consists of an aliphatic polyamide, or comprises an aromatic polyamide outside the aforementioned range, i.e., 50 to 90 wt. %. Conversely, even when the total film thickness is 20 µm or less, curl resistance can be imparted by adjusting the amount of aromatic polyamide in Layer C to the aforementioned range, i.e., 50 to 90 wt. %.

Preferable embodiments of the multilayer stretched film 1 of the present invention are shown below. Ex. 1

Layer A comprises polyethylene terephthalate (film thickness: 2 to 9 µm); Layer B comprises a modified polyester-based elastomer (maleic anhydride modified poly(tetramethylene ether) glycol/polyester block copolymer) (film thickness: 0.5 to 2.5 µm); Layer C is nylon-6 (film thickness: 5.5 to 12.5 µm); and the total film thickness is about 15 µm (about 10 to 20 µm). Ex. 2

Layer A comprises polyethylene terephthalate (film thickness: 2 to 14 µm); Layer B comprises a modified polyester-based elastomer (maleic anhydride modified poly(tetramethylene ether) glycol/polyester block copolymer) (film thickness: 0.5 to 3.5 µm); Layer C is nylon-6 (film thickness: 10.5 to 22.5 µm); and the total film thickness is about 25 µm (about 20 to 30 µm). Ex. 3

Layer A comprises polyethylene terephthalate (film thickness: 2 to 12 µm); Layer B comprises a modified polyester-based elastomer (maleic anhydride modified poly(tetramethylene ether) glycol/polyester block copolymer) (film thickness: 0.5 to 3.5 µm); and Layer C consists of nylon-6 and MXD nylon, wherein the amount of nylon-6 is 80 to 95 wt. %, and the amount of MXD nylon is 5 to 20 wt. % (film thickness: 7 to 22.5 µm). Ex. 4

Layer A comprises polyethylene terephthalate (film thickness: 2 to 12 µm); Layer B comprises a modified polyester-based elastomer (maleic anhydride modified poly(tetramethylene ether) glycol/polyester block copolymer) (film thickness: 0.5 to 3.5 µm); and Layer C comprises nylon-6 and MXD nylon, wherein the amount of nylon-6 is 20 to 40 wt. %, and the amount of MXD nylon is 60 to 80 wt. % (film thickness: 7 to 22.5 µm).

The multilayer stretched polyamide-based film 1 of the present invention may further comprise a gas barrier layer, a sealing layer, etc., if necessary. The packaging film of the present invention comprises Layer A, Layer B, Layer C, and a sealing layer, which is described later. A film comprising a gas barrier layer, e.g., a film comprising Layer A/Layer B/Layer C/gas barrier layer/Layer C, is referred to as multilayer stretched polyamide-based film 1'.

The gas barrier layer is a layer having low permeability of gas such as oxygen, nitrogen, carbon dioxide, etc. Examples thereof include ethylene-vinyl alcohol-based copolymers, aromatic polyamides, and the like.

Ethylene-vinyl alcohol-based copolymers are obtained by saponification of ethylene-vinyl acetate copolymers. The ethylene content of ethylene-vinyl alcohol-based copolymer is 20 to 70 mol %, and preferably 25 to 50 mol %. When the ethylene content is below 20 mol %, heat stability and moldability become poor; gel and like foreign substances are thereby easily generated during extrusion melt molding, and the film tears easily during stretching. When the ethylene content exceeds 70 mol %, sufficient barrier properties cannot be obtained. The ethylene-vinyl alcohol-based copolymer may be copolymerized or blended with other known components that do not cause remarkable deterioration in gas barrier properties. Further, the ethylene-vinyl alcohol-based copolymer may be blended with an ethylene-vinyl alcohol-based copolymer having different constituents. Examples of commercially available products of the ethylene-vinyl alcohol-based copolymer include "Eval" (produced by Kuraray Co., Ltd.), "Soarnol" (produced by Nippon Synthetic Chemical Industry Co., Ltd.), and the like.

Examples of aromatic polyamides include crystalline aromatic polyamides obtained by a polycondensation reaction of metaxylenediamine, paraxylenediamine or like aromatic diamine with adipic acid, suberic acid, sebacic acid, cyclohexanedicarboxylic acid, terephthalic acid, isophthalic acid or like dicarboxylic acid or a derivative thereof. A preferable example thereof is a crystalline aromatic polyamide such as polymethaxyleneadipamide (MXD-nylon). Specific examples include S-6007 and S-6011 (both are produced by Mitsubishi Gas Chemical Company, Inc.).

The thickness of the gas barrier layer is not particularly limited, and can be suitably determined as long as the effects of the present invention are not impaired.

(5) Packaging film

The packaging film of the present invention comprises Layer A, Layer B, Layer C, and a sealing layer.

Any sealing layer can be used as long as the layer has sealing properties. A sealing layer having a lower melting point than a resin forming the polyamide layer is preferably used. The melting point can be measured using a differential scanning calorimetry according to JIS K 7121.

Usable sealing layers are layers that comprise LLDPE (linear low-density polyethylene), LDPE (low-density polyethylene), HDPE (high-density polyethylene), and like polyethylenes; unstretched polypropylene, and like polypropylenes; or EVA (ethylene-vinyl acetate copolymer), EAA (ethylene-acrylic acid copolymer), EMAA (ethylene-methacrylic acid copolymer), EMA (ethylene-methyl acrylate copolymer), EEA (ethylene-ethyl acrylate copolymer), EMMA (ethylene-methylmetacrylate copolymer), ionomer, and like polyolefins. These resins can be used singly, or in a combination of two or more.

After biaxially stretching the multilayer laminate, the sealing layer is laminated on Layer C by a lamination method.

Examples of the lamination method include dry lamination, extrusion lamination, and the like. Dry lamination is a method in which an adhesive is applied to the multilayer stretched polyamide-based film of the present invention, and the film of the sealing layer is laminated on the adhesive; the sealing layer is thereby laminated on the multilayer stretched polyamide-based film. Extrusion lamination is a method in which a resin forming the sealing layer is extruded from an extruding machine, after which the resin is laminated on the multilayer stretched polyamide-based film of the present invention as a sealing layer; or a method in which a resin such as polyethylene is extruded from an extruding machine to the space between the multilayer stretched polyamide-based film of the present invention and the film of the sealing layer, thereby laminating the sealing layer on the multilayer stretched polyamide-based film of the present invention. When the sealing layer is laminated by means of extrusion lamination, it is preferred that the multilayer stretched polyamide-based film of the present invention be previously subjected to anchor coat treatment.

The lamination conditions are not particularly limited, and can be suitably selected from the conditions usually used in this field.

As a sealing layer, commercially available products can be suitably used. Examples thereof include T.U.X. FCS (film thickness: 50 μm, produced by Mitsui Chemical Tohcello, Inc.) and the like.

Although the thickness of the sealing layer is not particularly limited, it is preferably 20 to 150 μm, and more preferably 30 to 120 μm. The sealing layer having a thickness in the above range is preferable because sealing strength sufficient to protect the content can be attained when the facing surfaces of the sealing layer are heat-sealed to form a packaging film.

The resulting packaging film is formed into a bag, and the facing surfaces of the sealing layer are heat-sealed to obtain a packaging bag.

The heat-sealing conditions are not particularly limited, and can be suitably determined according to the kind and thickness of the material forming the sealing layer.

When high barrier properties are expected for the packaging film of the present invention, an aluminum foil layer can be formed between Layer C and the sealing layer (Layer A/Layer B/Layer C/aluminum foil layer/sealing layer).

The aluminum foil used herein is not particularly limited. For example, aluminum foil having a thickness of about 6 to 10 μm is preferred.

1.2 Multilayer Stretched Polyamide-Based Film 2

(1) Layer A

Layer A is the same as defined in the Multilayer Stretched Polyamide-Based Film 1.

(2) Layer B

Layer B is the same as defined in the Multilayer Stretched Polyamide-Based Film 1.

(3) Layer C

In the present invention, Layer C imparts bending resistance, impact resistance, etc. to the multilayer stretched film of the present invention. Layer C comprises an aliphatic polyamide.

(3-1) Aliphatic Polyamide

Examples of the aliphatic polyamide are the same as those explained in the section "Multilayer Stretched Polyamide-Based Film 1, Layer C, Item (3-1)". Of these, examples of preferable aliphatic polyamides include nylon-6, nylon-6,6, nylon-6/6,6 (a copolymer of nylon-6 and nylon-6,6), and the like. Among these, nylon-6 and nylon-6/6,6 are preferable, and nylon-6 is particularly preferable. As for a combination of two or more aliphatic polyamides, a combination of nylon-6 and nylon-6/6,6 (weight ratio of about 50:50 to 95:5) is preferable.

(3-2) Aromatic Polyamide

Layer C contains the aliphatic polyamide as an essential component, and aromatic polyamide may be added thereto, if necessary. Adding aromatic polyamide, depending on its amount, may impart excellent curl resistance to the multilayer stretched film of the present invention.

Examples of the aromatic polyamide are the same as those explained in the section "Multilayer Stretched Polyamide-Based Film 1, Layer C, Item (3-2)". Examples of preferable combinations of aliphatic polyamide and aromatic polyamide for Layer C of the present invention include a combination of nylon-6 and MXD-nylon, and a combination of nylon-6 and amorphous aromatic polyamide (amorphous nylon).

(3-3) Content of Aromatic Polyamide

When an aromatic polyamide is added to Layer C of the present invention, the content of the aromatic polyamide can be suitably selected within the aforementioned range depending on the physical properties to be imparted. For example, when the content of the aromatic polyamide is adjusted to from 1 wt. % or more to less than 50 wt. %, preferably from 1 to 25 wt. %, and more preferably from 1 wt. % or more to less than 25 wt. %, properties of Layer C such as the bending resistance and impact resistance will not be adversely affected. Further, by adjusting the content of the aliphatic polyamide in Layer C of the present invention to 10 wt. % or more, and preferably 20 wt. % or more, a sufficient lamination strength can be attained when the sealing layer is laminated thereon.

Layer C may comprises the aforementioned polyamide-based resins; however, known bending resistance-improving agents, inorganic or organic additives and the like may be added if necessary, insofar as they do not impair the effect of the present invention. The kind and the amount of the bending resistance-improving agent, or the inorganic or organic additives, are the same as those explained in the section "Multilayer Stretched Polyamide-Based Film 1, Layer C".

(4) Layer D

In the present invention, Layer D imparts curl resistance to the multilayer stretched film. Layer D comprises an aromatic polyamide.

Examples of aromatic polyamides include crystalline aromatic polyamides obtained by a polycondensation reaction of metaxylenediamine, paraxylenediamine or like aromatic diamine with adipic acid, suberic acid, sebacic acid, cyclohexanedicarboxylic acid, terephthalic acid, isophthalic acid or like dicarboxylic acid or a derivative thereof. A preferable example thereof is a crystalline aromatic polyamide such as polymethaxyleneadipamide (MXD-nylon). Specific examples include S-6007 and S-6011 (both are produced by Mitsubishi Gas Chemical Company, Inc.).

Layer D may further include an aliphatic polyamide. This makes it possible to improve pinhole resistance. Examples of the aliphatic polyamide include those described in the above section "Layer C". When Layer D comprises an aliphatic polyamide, the content thereof is 1 to 70 wt. %, preferably 1 to 50 wt. %, and more preferably 1 to 40 wt. %.

Layer D may comprises the aforementioned polyamide-based resins; however, known bending resistance-improving agents, inorganic or organic additives and the like may be added if necessary, insofar as they do not impair the effect of the present invention.

Examples of bending resistance-improving agents include polyolefins, polyester elastomers, polyamide elastomers and the like. The content of the bending resistance-improving agent may be suitably selected within the range of about 0.5 to 10 wt. %.

Examples of inorganic or organic additives include anti-blocking agents, nucleating agents, repellents, antioxidants, thermostabilizers, metal soap and the like. When an anti-blocking agent is necessary, silica, talc, kaolin and the like may be added within the range of about 100 to 5000 ppm.

(5) Layer Structure

The multilayer stretched polyamide-based film of the present invention comprises at least four layers, i.e., Layer A, Layer B, Layer C, and Layer D. It is preferred that Layer A be laminated as the outermost layer, and that Layers A, B, C, and D be laminated in this order.

The multilayer stretched polyamide-based film 2 of the present invention has a structure in which a sealing layer is to be laminated on Layer D by a lamination method, after biaxially stretching the multilayer laminate.

The total film thickness of the multilayer stretched polyamide-based film 2 of the present invention is not particularly limited, and may be suitably determined according to the application. The total film thickness thereof is generally about 6.5 to 50 μm, preferably about 10 to 50 μm, and more preferably about 10 to 30 μm.

In general, the film thickness of each layer is as follows.

Layer A preferably has a film thickness of about 1 μm or more, more preferably about 1 to 15 μm, and even more preferably about 2 to 12 μm. When Layer A has a thickness of 1 μm or more, excellent dimensional stability, aroma retention, heat resistance, etc. can be imparted to the multilayer film of the present invention.

Layer B preferably has a film thickness of about 0.5 to 5 μm, and more preferably about 0.5 to 2.5 μm. When Layer B has a thickness of 0.5 μm or more, the film thickness can be easily controlled, whereas when Layer B has a thickness of 5 μm or less, sufficient adhesion strength can be imparted and production cost can be reduced.

Layer C preferably has a thickness of 4 μm or more, more preferably about 4 to 35 μm, and even more preferably about 6 to 20 μm. When Layer C has a thickness of 4 μm or more, excellent bending resistance, impact resistance, etc. can be imparted to the multilayer stretched film of the present invention.

Layer D preferably has a thickness of 1 μm or more, more preferably about 1 to 10 μm, and even more preferably about 1 to 5 μm. When Layer D has a thickness of 1 μm or more, excellent curling resistance, lamination applicability, etc. can be imparted to the multilayer stretched film of the present invention.

The total film thickness of Layer C and Layer D is 5 μm or more, preferably about 5 to 45 μm, and more preferably about 7 to 25 μm. When the total film thickness of Layer C and Layer D is 5 μm or more, excellent bending resistance, impact resistance, etc. can be imparted to the multilayer stretched film of the present invention.

A preferable embodiment of the multilayer stretched film 2 of the present invention is shown below. Layer A comprises polyethylene terephthalate (film thickness: 2 to 12 μm); Layer B comprises maleic anhydride modified poly(tetramethylene ether) glycol/polyester block copolymer (film thickness: 0.5 to 2.5 μm); Layer C comprises nylon-6 (film thickness: 7 to 20 μm); and Layer D comprises MXD nylon and nylon-6, wherein the amount of MXD nylon is 60 to 80 wt. %, and the amount of nylon-6 is 20 to 40 wt. % (film thickness: 1 to 5 μm).

The multilayer stretched polyamide-based film 2 of the present invention may further comprise an adhesive layer, a gas barrier layer, a sealing layer, etc., if necessary. The sealing layer is laminated on Layer D by a lamination method after biaxially stretching Layer A, Layer B, Layer C, and Layer D.

The multilayer stretched film of the present invention may be structured to have the aforementioned four layers; however, it may also be structured to have 5 or more layers, if necessary.

Specific examples of such a structure are Layer A/Layer B/Layer C/Layer D; Layer A/Layer B/Layer C/gas barrier layer/Layer C/Layer D; Layer A/Layer B/Layer C/gas barrier layer/Layer D; Layer A/Layer B/gas barrier layer/Layer C/Layer D, Layer A/Layer B/Layer C/Layer D/sealing layer; etc. Note that even when the film has a structure other than a four-layer structure, Layer A and Layer D are positioned so that they are the outside and the inside of the film, respectively. Of these, a film having a sealing layer on Layer D is referred to as the packaging film of the present invention, which is described later.

The adhesive layer is a layer in which a known adhesive is used. The adhesive layer can be formed between Layer A and Layer B, Layer B and Layer C, Layer C and Layer D, or any one of Layers A to D and the gas barrier layer.

The gas barrier layer is a layer having low permeability of gas such as oxygen, nitrogen, carbon dioxide, etc. Examples thereof include ethylene-vinyl alcohol-based copolymers, aromatic polyamides, and the like.

Examples of the ethylene-vinyl alcohol-based copolymer and aromatic polyamide are the same as those explained in the section "Multilayer Stretched Polyamide-Based Film 1, Item (4)".

Examples of the sealing layer are the same as those explained in the section "Multilayer Stretched Polyamide-Based Film 1, Item (4)".

The thickness of the adhesive layer or gas barrier layer is not particularly limited, and can be suitably determined as long as the effects of the present invention are not impaired.

(6) Packaging film

The packaging film of the present invention comprises a sealing layer on Layer D; specifically, it has the structure Layer A/Layer B/Layer C/Layer D/sealing layer.

The sealing layer may be laminated on Layer (D) by a lamination method. Examples of the lamination method include dry lamination, extrusion lamination, and the like. Dry lamination is a method in which an adhesive is applied to the multilayer stretched polyamide-based film of the present invention, and the film of the sealing layer is laminated on the adhesive; the sealing layer is thereby laminated on the multilayer stretched polyamide-based film. Extrusion lamination is a method in which a resin forming the sealing layer is extruded from an extruding machine, after which the resin is laminated on the multilayer stretched polyamide-based film of the present invention as a sealing layer; or a method in which a resin such as polyethylene is extruded from an extruding machine to the space between the multilayer stretched polyamide-based film of the present invention and the film of the sealing layer, thereby laminating the sealing layer on the multilayer stretched polyamide-based film of the present invention. When the sealing layer is laminated by means of extrusion lamination, it is preferred that the multilayer stretched polyamide-based film of the present invention be previously subjected to anchor coat treatment.

The lamination conditions are not particularly limited, and can be suitably selected from the conditions usually used in this field.

As a sealing layer, commercially available products can be suitably used. Examples thereof include T.U.X. FCS (film thickness: 50 μm, produced by Mitsui Chemical Tohcello, Inc.) and the like.

Although the thickness of the sealing layer is not particularly limited, it is preferably 20 to 150 μm, and more preferably 30 to 120 μm. The sealing layer having a thickness in the above range is preferable because sealing strength sufficient to protect the content can be attained when the facing surfaces of the sealing layer are heat-sealed to form a packaging film.

The resulting packaging film is formed into a bag, and the facing surfaces of the sealing layer are heat-sealed to obtain a packaging bag.

The heat-sealing conditions are not particularly limited, and can be suitably determined according to the kind and thickness of the material forming the sealing layer.

When high barrier properties are expected for the packaging film of the present invention, an aluminum foil layer can be formed between Layer D and the sealing layer (Layer A/Layer B/Layer C/Layer D/aluminum foil layer/sealing layer).

The aluminum foil used herein is not particularly limited. For example, aluminum foil having a thickness of about 6 to 10 μm is preferred.

2. Production Method

In the multilayer stretched polyamide-based films 1 and 2 of the present invention, each layer is laminated by biaxial stretching to have the aforementioned layer structure.

The multilayer stretched film of the present invention is produced according to the following method. First, the flat multilayer film is obtained, for example, by co-extruding the resin layers from a T-die and laminating the layers in an appropriate order onto a chilled roll where cooling water circulates. The film thus obtained is stretched to 2.5 to 4.5 times its original size in the machine direction at 50 to 100° C. using a roll stretching machine. Then, the film is stretched to 2.5 to 5 times its original size in the transverse direction using a tenter stretching machine at an atmospheric temperature of 90 to 150° C. Subsequently, the film is thermally treated at an atmospheric temperature of 100 to 240° C. using the tenter stretching machine.

The multilayer stretched film of the present invention may be subjected to simultaneous or sequential biaxial stretching. The obtained multilayer stretched film may be treated with corona discharge surface treatment on one or both sides, if necessary. When the corona discharge treatment is performed on one side, it is preferred that the surface opposite to the Layer A side be treated. The surface opposite to the Layer A side indicates the surface of the Layer C side in the multilayer stretched polyamide-based film 1, and the surface of the Layer D side in the multilayer stretched polyamide-based film 2.

Corona discharge treatment is performed as follows. High voltage (several thousand volts) is applied between a grounded metal roller and knife-shaped electrodes that are aligned on the metal roller at an interval of several millimeters to generate corona discharge. A film passes through the space between the roller and the discharging electrodes at high speed, during which the surface of the film is treated by corona discharge. Affinity for adhesive, ink, coating composition, etc. is therefore improved. The degree of the treatment can be determined by controlling discharging current. The surface after corona discharge treatment has a wetting tension of 46 mN/m or more, and preferably 50 mN/m or more. The wetting tension is measured by the method according to JIS K 6768.

3. Characteristics of Multilayer Stretched Polyamide-Based Film 3.1 Multilayer Stretched Polyamide-Based Film 1

Since the thus-obtained multilayer stretched polyamide-based film 1 of the present invention has excellent bending resistance, lamination strength, thermal dimensional stability, and aroma retention, and the lamination strength is measureable when the sealing layer is laminated thereon, the multilayer stretched polyamide-based film 1 can be suitably used as a packaging film.

Bending Resistance

The multilayer stretched polyamide-based film 1 of the present invention has excellent wear resistance to bending. Specifically, the present invention has a feature in that the number of pinholes generated in the Gelbo flex test (1000 times at room temperature (23° C.)) is 20 or less, and preferably 10 or less per 300 cm$^2$. Pinholes due to bending are evaluated as described in Test Example 1.

Thermal Dimensional Stability

The multilayer stretched polyamide-based film 1 of the present invention has excellent thermal dimensional stability. The thermal dimensional stability is evaluated as described in Test Example 1. Under such measurement conditions, the shrinkage of the multilayer stretched polyamide-based film of the present invention is 3% or less, and preferably 2.5% or less.

Aroma Retention

The multilayer stretched film 1 of the present invention has excellent aroma retention. The evaluation method of aroma retention is as described in Test Example 1.

Curl Resistance

The multilayer stretched polyamide-based film 1 of the present invention has excellent curl resistance. Particularly, when the film has a total film thickness of 20 µm or more, preferably 25 to 50 µm, and more preferably 35 to 50 µm, or when Layer B contains 50 to 90 wt. % of aromatic polyamide, and preferably 60 to 80 wt. % of aromatic polyamide, the multilayer stretched polyamide-based film 1 exhibits more excellent curl resistance.

The curl resistance is evaluated as described in Test Example 1. In the evaluation, the mat area is 30 cm$^2$ or less, preferably 20 cm$^2$ or less, and more preferably 10 cm$^2$ or less. The mat area being 75 cm$^2$ or less, preferably 70 cm$^2$ or less causes no problems in practical use.

Lamination Strength

Since the multilayer stretched polyamide-based film 1 of the present invention has the aforementioned characteristics, it is suitably used as a packaging film.

When the multilayer stretched polyamide-based film 1 is used as a packaging film, a sealing layer is laminated on the Layer C side of the film. In the packaging film, lamination strength between the multilayer stretched polyamide-based film and the sealing layer is measured according to a T-shape peeling method. In the multilayer stretched polyamide-based film of the present invention, since delamination during peeling occurs between the multilayer stretched polyamide-based film and the sealing layer rather than between Layer A and Layer B, the lamination strength is measurable. The sealing layer may be a resin film having heat-sealing properties, and the materials of the sealing layer described above can be used. The sealing layer can be laminated on the multilayered polyamide film by a known method.

Since the multilayer stretched polyamide-based film 1 of the present invention has the aforementioned characteristics, it is suitably used as a packaging film. When the multilayer stretched polyamide-based film 1 is used as a packaging film, the sealing layer is laminated on the Layer C side of the multilayer stretched polyamide-based film 1. The packaging film is formed into a bag with the outer layer (Layer A) facing outward, and the facing surfaces of the sealing layer are heat-sealed to form a packaging bag.

3.2 Multilayer Stretched Polyamide-Based Film 2

Since the thus-produced multilayer stretched polyamide-based film 2 of the present invention has excellent bending resistance, thermal dimensional stability, aroma retention, and curl resistance, it is suitably used as a packaging film.

Bending Resistance

The multilayer stretched polyamide-based film 2 of the present invention has excellent wear resistance to bending. Specifically, the present invention has a feature in that the number of pinholes generated in the Gelbo flex test (1000 times at room temperature (23° C.)) is 10 or less, and preferably 5 or less per 300 cm$^2$. Pinholes due to bending are evaluated as described in Test Example 1.

Thermal Dimensional Stability

The multilayer stretched polyamide-based film 2 of the present invention has excellent thermal dimensional stability. The thermal dimensional stability is evaluated by subjecting a sample (MD×TD=100 mm×100 mm) to a retort treatment (for 30 min at 121° C.), and measuring the shrinkage after treatment. Under such measurement conditions, the shrinkage percentage of the multilayer stretched polyamide-based film of the present invention is 3.0% or less, and preferably 2.5% or less.

Aroma Retention

The multilayer stretched film 2 of the present invention has excellent aroma retention. The evaluation method of aroma retention is as described in Test Example 1.

Curl Resistance

The multilayer stretched polyamide-based film 2 of the present invention has excellent curl resistance. The curl resistance is evaluated as described in Test Example 1. In the evaluation, the mat area is 30 cm$^2$ or less, preferably 20 cm$^2$ or less, and more preferably 10 cm$^2$ or less.

Since the multilayer stretched polyamide-based film 2 of the present invention has the aforementioned characteristics, it is suitably used as a packaging film. When the multilayer stretched polyamide-based film 2 is used as a packaging film, the sealing layer is laminated on either side of the multilayer stretched polyamide-based film 2. The packaging film is formed into a bag with the outermost layer facing outward, and the facing surfaces of the sealing layer are heat-sealed to form a packaging bag.

The packaging bag obtained by using the multilayer stretched polyamide-based film 1 or 2 is filled with content to form a package.

The kind of content to be packed is not limited. However, the effects of the present invention are significantly exhibited particularly when the contents to be packed are liquid-based foods, such as soups, konnyaku (devil's tongue), tsukemono (pickled vegetables), etc.; foods that are heavy in weight, such as mochi (rice cakes), sausages, seasonings, etc.; liquids that are heavy in weight, such as refillable shampoo, conditioner, body soap, detergent, etc.; those that require a large bag capacity, such as rice, ice, etc.; and those having a strong smell, such as soy sauce, vinegar, etc.

Examples of forms of the packaging bag include three-side seal forms, envelope forms, gusset forms, flat bottom forms, and other bag forms; and standing pouches, spout pouches, refillable pouches, and the like.

Since the multilayer stretched polyamide-based film of the present invention has high transparency, the content can be easily observed with the naked eye when the film is formed into a package.

EXAMPLES

Hereinafter, the present invention is described with reference to Examples. However, the present invention is not limited to these Examples.

Example 1-1

A crystalline polyester "BELLPET-EFG6C" (produced by Bell Polyester Products, Inc.) was used for forming Layer A, a modified polyester-based elastomer "PRIMALLOY IF203" (produced by Mitsubishi Chemical Corporation) was used for forming Layer B, and an aliphatic polyamide, i.e., nylon-6 "UBE Nylon 1022B" (produced by Ube Industries Ltd.), was used for forming Layer C.

The resins forming each layer were coextruded from a T-die to form a flat film of three layers laminated in the order of layer A/layer B/layer C on a chill roll where cooling water was circulating. The obtained three-layer film was stretched to 2.7 times its original size in the machine direction using a roll stretching machine at 65° C., and stretched to 4.0 times its original size in the transverse direction using a tenter stretching machine at an atmospheric temperature of 110° C. Subsequently, the film was thermally treated at an atmospheric temperature of 210° C. using the same tenter stretching machine to form a 15 μm-thick multilayer stretched polyamide-based film. Table 1 shows the thickness of each of the layers. Table 1 shows the thickness of each of the layers.

Example 1-2

A multilayer stretched film was formed in the same manner as in Example 1-1, except that a crystalline polyester "BELL-PET-PIFG5" (produced by Bell Polyester Products, Inc.) was used for forming Layer A; and a resin containing 90 wt % of an aliphatic polyamide resin, i.e., nylon-6 "UBE Nylon 1022B" (produced by Ube Industries Ltd.), and 10 wt % of an aromatic polyamide resin, i.e., amorphous nylon "Selar PA" (produced by Du Pont-Mitsui Polychemicals Co., Ltd.), was used for forming Layer C.

Example 1-3

A multilayer stretched film was formed in the same manner as in Example 1-1, except that a resin containing 90 wt % of an aliphatic polyamide resin, i.e., nylon-6 "UBE nylon 1022B" (produced by Ube Industries Ltd.), and 10 wt % of an aromatic polyamide resin, i.e., amorphous nylon "Selar PA" (produced by Du Pont-Mitsui Polychemicals Co., Ltd.), was used for forming Layer C. Table 1 shows the thickness of each of the layers.

Example 1-4

A multilayer stretched film was formed in the same manner as in Example 1-1, except that a resin containing 30 wt % of an aliphatic polyamide resin, i.e., nylon-6 "UBE nylon 1022B" (produced by Ube Industries Ltd.), and 70 wt % of an aromatic polyamide resin, i.e., MXD nylon "S6007" (produced by Mitsubishi Gas Chemical Company, Inc.), was used for forming Layer C. Table 1 shows the thickness of each of the layers.

Examples 1-5 to 1-8

Multilayer stretched films of Examples 1-5 to 1-8 were formed in the same manner as in Example 1-1, except that the thickness of each layer was changed as shown in Table 1 below.

Comparative Example 1-1

A multilayer stretched film was formed in the same manner as in Example 1-4, except that the thickness of each layer was changed as shown in Table 1 below.

Comparative Example 1-2

A multilayer stretched film was formed in the same manner as in Example 1-1, except that Layer C was formed by using an aromatic polyamide resin (MXD nylon "S6007" (produced by Mitsubishi Gas Chemical Company, Inc.)) in place of the aliphatic polyamide. Table 1 shows the thickness of each of the layers.

Comparative Example 1-3

A 15 μm-thick film was formed in the same manner as in Example 1-1, by using an aliphatic polyamide resin, i.e., nylon-6 "UBE Nylon 1022B" (produced by Ube Industries Ltd.).

Comparative Example 1-4

A 12 μm-thick film was formed in the same manner as in Example 1-1, by using a crystalline polyester "BELLPET-EFG6C" (produced by Bell Polyester Products, Inc.).

Comparative Example 1-5

A multilayer stretched film was formed in the same manner as in Example 1-1, except that the resins forming each layer were laminated in the order of A/B/C/B/A. Table 2 shows the thickness of each of the layers.

A corona discharge treatment (treatment strength: 12 W·min/m) was performed on the surface of Layer C in Examples 1-1 to 1-8 and Comparative Examples 1-1 and 1-2; on one surface of Layer A in Comparative Example 1-3; on one surface of Layer C in Comparative Example 1-4; and on one surface of Layer A in Comparative Example 1-5.

Test Example 1

The multilayer stretched films obtained in Examples 1-1 to 1-8 and Comparative Examples 1-1 to 1-5 were evaluated for bending resistance, thermal dimensional stability, aroma retention, curl resistance, and lamination characteristics. Table 3 shows the results.

Bending Resistance Test

Pinhole resistance by bending (bending resistance) was evaluated using a Gelbo flex tester produced by Rikagaku Kogyo K.K., in the following manner. Each multilayer stretched film sample was formed into a cylindrical bag having a layflat width of 150 mm and a length of 300 mm. The bag was attached to a Gelbo flex tester, and flexed 1,000 times at an ordinary temperature (23° C.) at a torsional angle of 440°, and with a twist and linear horizontal motion of 62.5 cm. Then, using a penetrant, the number of pinholes formed on the central portion (300 cm$^2$) of each sample was counted. The number of pinholes was counted in regard to three samples each, and the respective average values were shown as the results.

Thermal Dimensional Stability Test

Thermal dimensional stability was evaluated by subjecting each sample, MD×TD=100 mm×100 mm, to a retort treatment (at 121° C. for 30 minutes), and measuring the shrinkage after the treatment.

Aroma Retention Test

Each film sample was formed into a small bag (3 cm×8 cm). Then, each of the bags was filled with 5 mL of vinegar (rice vinegar, fermented vinegar), and sealed. Each of these bags was put in a glass bottle, and each bottle was sealed. The vinegar smell after three days was evaluated by sensory evaluation in accordance with an evaluation criteria (n=6). Table 3 shows average values.

Sensory Evaluation Criteria

5: Scentless
4: Very weak smell
3: Slight smell
2: Smell
1: Strong smell

Curl Resistance

After samples were stored in an atmosphere at 23° C. and 50% RH for 24 hours, each of the samples was put on a mat so that Layer A was on top (in Comparative Example 1-4, Layer C was on top). Subsequently, each of the samples was cut on the mat with an "X", i.e., diagonally across a square: MD×TD=10 cm×10 cm, in one and the other direction; and the mat area, which can be seen from directly thereabove when the film curled, was measured. The mat area was measured by downloading images taken with a digital camera onto a computer, and using an image analysis software, NIH Image (National Institute of Health). When the measured area value was 30 cm$^2$ or less, the sample was evaluated as having an excellent curl resistance.

Lamination Characteristics

Using the obtained multilayer stretched polyamide-based films, a dry lamination was conducted in the following manner. To the corona-discharge treated surface of each film, an adhesive (produced by Dainichiseika Colour & Chemicals Mfg. Co., Ltd.; base resin: Seika Bond E-372; curing agent: Seika Bond C-76-2.0; and base resin:curing agent:ethyl acetate=17:2:1000 (weight ratio)) was applied in an amount of 4.0 g/m$^2$ (when dried) using a reverse roll coater. After the film was dried with hot air at 60° C., a sealing layer (T.U.X. FCS, 50 μm, produced by Tohcello Co., Ltd.) was laminated thereon, and pressed through nip rolls at 40° C. The resulting product was subjected to heat curing at 40° C. for 48 hours, thereby obtaining a packaging film. With respect to the obtained packaging film, the multilayer stretched polyamide-based film and the sealing layer were delaminated by a T-shape peeling method, and evaluation was conducted in accordance with the following evaluation criteria.

A: delamination occurred during peeling between the multilayer stretched polyamide-based film and the sealing layer.

B: delamination occurred between the layers of the multilayer stretched polyamide-based film.

TABLE 1

| | Layer Structure | | |
|---|---|---|---|
| | Layer A | Layer B | Layer C |
| Example 1-1 | 3 μm | 1 μm | 11 μm |
| Example 1-2 | 2 μm | 1 μm | 12 μm |
| Example 1-3 | 3 μm | 1 μm | 11 μm |
| Example 1-4 | 3 μm | 1 μm | 11 μm |
| Example 1-5 | 6 μm | 2 μm | 17 μm |
| Example 1-6 | 7 μm | 1 μm | 7 μm |
| Example 1-7 | 12 μm | 2 μm | 11 μm |
| Example 1-8 | 8 μm | 1 μm | 16 μm |
| Comparative Example 1-1 | 11 μm | 1 μm | 3 μm |
| Comparative Example 1-2 | 3 μm | 1 μm | 11 μm |
| Comparative Example 1-3 | 15 μm | — | — |
| Comparative Example 1-4 | — | — | 12 μm |

TABLE 2

| | Layer A | Layer B | Layer C | Layer B | Layer A |
|---|---|---|---|---|---|
| Comparative Example 1-5 | 2 μm | 1 μm | 9 μm | 1 μm | 2 μm |

TABLE 3

| | Bending Resistance (the number) | Thermal Dimensional Stability (%) | | Aroma Retention | Curl Resistance (cm$^2$) | Lamination Characteristics |
|---|---|---|---|---|---|---|
| | | MD | TD | | | |
| Ex. 1-1 | 1.3 | 1.6 | 2.2 | 3.8 | 68 | A |
| Ex. 1-2 | 1.7 | 1.8 | 2.4 | 3.5 | 62 | A |
| Ex. 1-3 | 2.0 | 1.8 | 2.4 | 4.0 | 66 | A |
| Ex. 1-4 | 12.0 | 1.5 | 1.8 | 4.0 | 18 | A |
| Ex. 1-5 | 4.0 | 1.8 | 2.3 | 4.3 | 23 | A |
| Ex. 1-6 | 4.7 | 1.5 | 2.0 | 4.3 | 48 | A |
| Ex. 1-7 | 6.3 | 1.5 | 2.3 | 4.7 | 12 | A |
| Ex. 1-8 | 4.3 | 1.7 | 2.3 | 4.4 | 18 | A |
| Com. Ex. 1-1 | 27.3 | 1.8 | 2.0 | 4.5 | 36 | B |
| Com. Ex. 1-2 | 20.0 | 1.5 | 1.7 | 4.3 | 10 | A |
| Com. Ex. 1-3 | 0.3 | 2.5 | 4.5 | 2.1 | 0 | A |
| Com. Ex. 1-4 | 31.3 | 1.0 | 1.5 | 4.7 | 0 | A |
| Com. Ex. 1-5 | 2.3 | 1.7 | 2.0 | 4.0 | 0 | B |

Table 3 confirms that all of the multilayer stretched films obtained in Examples 1-1 to 1-8 exhibit excellent bending resistance, thermal dimensional stability, aroma retention, and lamination characteristics. Table 3 also confirms that these films also have aroma retention similar to that of the stretched film formed of a crystalline polyester, obtained in Comparative Example 1-4. The stretched film formed of an aliphatic polyamide, obtained in Comparative Example 1-3, showed unsatisfactory thermal dimensional stability and aroma retention.

Furthermore, the results of Examples 1-5, 1-7, and 1-8 reveal that the multilayer stretched films of the present invention having a total film thickness of 25 μm exhibited excellent curl resistance, even with the asymmetric three-layer configuration. The film of Example 1-4, in which Layer C was formed using predetermined amounts of aliphatic polyamide and aromatic polyamide, showed excellent curl resistance, even with a total film thickness of 15 μm.

In contrast, the multilayer stretched film of Comparative Example 1-1, in which Layer C had a film thickness of 3 μm, had an unsatisfactory bending resistance and curl resistance. Further, the film obtained in Comparative Example 1-2, in which Layer C was formed using only an aromatic polyamide, exhibited unsatisfactory bending resistance.

The above results clarified that a multilayer stretched film comprising sequentially laminated Layer A/Layer B/Layer C, wherein Layer A has a thickness of 2 to 12 μm, Layer B has a thickness of 1 to 2 μm, and Layer C has a thickness of 7 to 17 μm; and wherein Layer A is formed of a crystalline polyester, Layer B is formed of a modified polyester-based elastomer, and Layer C is formed of an aliphatic polyamide, exhibits excellent bending resistance, thermal dimensional stability, aroma retention, and lamination characteristics.

It is also confirmed that the above-mentioned multilayer stretched film further exhibits excellent curl resistance when the total film thickness is 25 μm, or when Layer C contains a predetermined proportion (70 wt %) of aromatic polyamide.

Example 2-1

A crystalline polyester "BELLPET-EFG6C" (produced by Bell Polyester Products, Inc.) was used for forming Layer A; a modified polyester-based elastomer "PRIMALLOY IF203" (produced by Mitsubishi Chemical Corporation) was used for forming Layer B; an aliphatic polyamide resin, i.e., nylon-6 "UBE Nylon 1022B" (produced by Ube Industries Ltd.), was used for forming Layer C; and a resin containing 70 wt % of an aromatic polyamide, i.e., MXD nylon "S6007" (produced by Mitsubishi Gas Chemical Company, Inc.), and 30 wt % of an aliphatic polyamide resin, i.e., nylon-6 "UBE nylon 1022B" (produced by Ube Industries Ltd.), was used for forming Layer D.

The resins forming each layer were coextruded from a T-die to form a flat film of four layers laminated in the order of layer A/layer B/layer C/Layer D on a chill roll while cooling water was circulating. The obtained three-layer film was stretched to 2.7 times its original size in the machine direction using a roll stretching machine at 65° C., and stretched to 4.0 times its original size in the transverse direction using a tenter stretching machine at an atmospheric temperature of 110° C. Subsequently, the film was thermally treated at an atmospheric temperature of 210° C. using the same tenter stretching machine to form a 15 μm-thick four-layered film. Table 4 shows the thickness of each of the layers.

Example 2-2

A multilayer stretched film was formed in the same manner as in Example 2-1, except that a crystalline polyester "BELL-PET-PIFG5" (produced by Bell Polyester Products, Inc.) was used for forming Layer A; a resin containing 90 wt % of an aliphatic polyamide resin, i.e., nylon-6 "UBE nylon 1022B" (produced by Ube Industries Ltd.), and 10 wt % of an aromatic polyamide resin, i.e., amorphous nylon "Selar PA" (produced by Du Pont-Mitsui Polychemicals Co., Ltd.), was used for forming Layer C; and an aromatic polyamide, i.e., MXD nylon "S6007" (produced by Mitsubishi Gas Chemical Company, Inc.), was used for forming Layer D. Table 4 shows the thickness of each of the layers.

Example 2-3

A multilayer stretched film was formed in the same manner as in Example 2-1, except that a resin containing 50 wt % of an aromatic polyamide, i.e., MXD nylon "S6007" (produced by Mitsubishi Gas Chemical Company, Inc.), and 50 wt % of an aliphatic polyamide resin, i.e., nylon-6 "UBE nylon 1022B" (produced by Ube Industries Ltd.), was used for forming Layer D. Table 4 shows the thickness of each of the layers.

Examples 2-4 to 2-6

Multilayer stretched films of Examples 2-4 to 2-6 were formed in the same manner as in Example 2-1, except that the thickness of each layer was changed as shown in Table 4 below.

Comparative Example 2-1

A multilayer stretched film was formed in the same manner as in Example 2-1, except that the thickness of each layer was changed as shown in Table 4 below.

Comparative Example 2-2

A multilayer stretched film laminated in the order of Layer A/Layer B/Layer D/Layer C was formed using the same components as those used in Example 2-1. The forming process was carried out under the same conditions as those of Example 2-1. Table 4 shows the thickness of each of the layers.

A corona discharge treatment (treatment strength: 12 W·min/m) was performed on the surface of Layer D in Examples 2-1 to 2-6 and Comparative Example 2-1, and on the surface of Layer C in Comparative Example 2-2.

The multilayer stretched films obtained in Examples 2-1 to 2-6 and Comparative Examples 2-1 and 2-2 were evaluated for the bending resistance, thermal dimensional stability, aroma retention, and curl resistance, in the same manner as in Test Example 1. Table 5 shows the results.

TABLE 4

| | Layer Configuration | | | |
|---|---|---|---|---|
| | Layer A | Layer B | Layer C | Layer D |
| Example 2-1 | 3 μm | 1 μm | 9 μm | 2 μm |
| Example 2-2 | 3 μm | 1 μm | 9 μm | 2 μm |
| Example 2-3 | 3 μm | 1 μm | 9 μm | 2 μm |
| Example 2-4 | 6 μm | 1 μm | 6 μm | 2 μm |
| Example 2-5 | 6 μm | 2 μm | 13 μm | 4 μm |
| Example 2-6 | 12 μm | 2 μm | 7 μm | 4 μm |
| Comparative Example 2-1 | 11 μm | 1 μm | 2 μm | 1 μm |
| | Layer A | Layer B | Layer D | Layer C |
| Comparative Example 2-2 | 3 μm | 1 μm | 2 μm | 9 μm |

TABLE 5

| | Bending Resistance | Thermal Dimensional Stability (%) | | Aroma Retention | Curl Resistance |
|---|---|---|---|---|---|
| | (the number) | MD | TD | | (cm$^2$) |
| Ex. 2-1 | 2.3 | 1.7 | 2.2 | 4.0 | 19 |
| Ex. 2-2 | 4.0 | 1.9 | 2.5 | 3.8 | 9 |
| Ex. 2-3 | 4.3 | 1.5 | 2.1 | 4.0 | 23 |
| Ex. 2-4 | 7.0 | 1.5 | 2.0 | 4.3 | 12 |
| Ex. 2-5 | 5.3 | 2.2 | 2.5 | 4.3 | 10 |
| Ex. 2-6 | 5.7 | 2.0 | 2.4 | 4.5 | 5 |
| Com. Ex. 2-1 | 28.0 | 1.8 | 2.0 | 4.5 | 12 |
| Com. Ex. 2-2 | 4.7 | 1.7 | 2.0 | 3.8 | 62 |

Table 5 reveals that all of the films obtained in Examples 2-1 to 2-6 exhibit excellent bending resistance, thermal dimensional stability, aroma retention, and curl resistance.

In contrast, the multilayer stretched film of Comparative Example 2-1, in which Layer C has a thickness of 2 μm, showed unsatisfactory bending resistance. The multilayer stretched film of Comparative Example 2-2, in which Layer C and Layer D were laminated in an order different from that of the other Examples, also showed unsatisfactory curl resistance.

The above results clarified that a multilayer stretched film comprising sequentially laminated Layer A/Layer B/Layer C/Layer D, wherein Layer A contains a crystalline polyester, Layer B contains a modified polyester-based elastomer, Layer (C) contains an aliphatic polyamide, and Layer (D) contains predetermined amounts of an aromatic polyamide and an aliphatic polyamide, exhibits excellent bending resistance, lamination strength, thermal dimensional stability, aroma retention, and curl resistance. Further, it is also clarified that in the above-described multilayer stretched film, when Layer A has a thickness of 3 to 12 μm, Layer B has a thickness of 1 to 2 μm, Layer C has a thickness of 6 to 13 μm, and Layer D has a thickness of 2 to 4 μm, the excellent effects described above can be achieved.

The invention claimed is:
1. A multilayer stretched polyamide-based film obtained by biaxially stretching a multilayer laminate comprising at least a polyester layer (Layer A), an adhesive layer (Layer B), a polyamide layer (Layer C), and a polyamide layer (layer D), Layer A containing a crystalline polyester,
Layer B containing a modified polyester-based elastomer,
Layer C containing an aliphatic polyamide,
Layer D containing an aromatic polyamide, and
Layer C and Layer D having a total thickness of 5 μm or more, and
the crystalline polyester content is 50 wt. % or more per total weight of the components of Layer A, and
wherein a sealing layer is laminated on Layer D by a lamination method, after biaxially stretching the multilayer laminate.

2. The multilayer stretched polyamide-based film according to claim 1, wherein the crystalline polyester contained in Layer A is polyethylene terephthalate or isophthalic acid copolymerized polyethylene terephthalate.

3. The multilayer stretched polyamide-based film according to claim 1, wherein the aliphatic polyamide contained in Layer C is at least one member selected from the group consisting of nylon-6, copolymers of nylon-6 and nylon-6,6, and mixtures thereof.

4. The multilayer stretched polyamide-based film according to claim 1, wherein Layer C further contains aromatic polyamide in a proportion of 1 wt. % or more, and less than 50 wt. %.

5. The multilayer stretched polyamide-based film according to claim 4, wherein the aromatic polyamide is polymethaxyleneadipamide or amorphous nylon.

6. The multilayer stretched polyamide-based film according to claim 1, wherein the aromatic polyamide is polymethaxyleneadipamide.

7. The multilayer stretched polyamide-based film according to claim 1, wherein corona discharge treatment is applied to the surface opposite to the Layer A side.

8. The multilayer stretched polyamide-based film according to claim 1, which has a total thickness within the range of 10 to 50 μm.

9. A packaging film comprising the multilayer stretched polyamide-based film of claim 1.

10. The packaging film according to claim 9, wherein the sealing layer comprises at least one resin selected from the group consisting of linear low-density polyethylene, low-density polyethylene, unstretched polypropylene, and ethylene-vinyl acetate copolymer.

11. A packaging bag obtained by forming the packaging film of claim 9 into a bag-like shape, and then heat-sealing facing surfaces of the sealing layer.

12. A package comprising the packaging bag of claim 11 with content placed inside.

* * * * *